United States Patent [19]
Harrison et al.

[11] 3,976,179
[45] Aug. 24, 1976

[54] CONTROLLING THE TEMPERATURE OF A DEPROPANIZER TOWER BY CHROMATOGRAPHIC ANALYSIS OF FEED AND BOTTOMS

[75] Inventors: Charles W. Harrison, Nederland; Glenn A. Senters, Beaumont, both of Tex.

[73] Assignee: Texaco Inc., New York, N.Y.

[22] Filed: Dec. 30, 1974

[21] Appl. No.: 537,163

[52] U.S. Cl. .............................. 196/132; 202/160; 203/3; 208/DIG. 1; 208/354
[51] Int. Cl.² ..................... B01D 3/42; B01D 3/00; C10G 7/00
[58] Field of Search ................... 196/132; 202/160; 203/3; 208/DIG. 1, 351, 354

[56] References Cited
UNITED STATES PATENTS

| | | | |
|---|---|---|---|
| 3,177,138 | 4/1965 | Larrison | 208/DIG. 1 |
| 3,224,947 | 12/1965 | Lupfer | 202/160 |
| 3,227,631 | 1/1966 | Stine | 202/160 |
| 3,259,554 | 7/1966 | Constantikes | 196/132 |
| 3,361,646 | 1/1968 | MacMullan et al. | 196/132 |

*Primary Examiner*—Norman Yudkoff
*Assistant Examiner*—J. Sofer
*Attorney, Agent, or Firm*—T. H. Whaley; C. G. Ries; Ronald G. Gillespie

[57] ABSTRACT

The reboiler temperature of a depropanizer tower is controlled as the function of the propane content of the feed to the depropanizer tower and of the gasoline provided by the tower in accordance with a control signal. The Reid Vapor Pressure of crude oil feeding a flash tower is determined from the propane content of the depropanizer feed while the Reid Vapor Pressure of the gasoline is determined from the gasoline propane content. A control unit includes a network which determines a change in the Reid Vapor Pressure as the quality of the feed crude oil to the flash tower changes. When the change in the Reid Vapor Pressure exceeds a predetermined limit, the network provides a feed forward signal corresponding to a desired temperature associated with the new Reid Vapor pressure. The feed forward desired temperature signal is determined in accordance with the equations hereinafter disclosed. The feed forward desired temperature signal is supplied to a set point signal circuit which implements the feed forward desired temperature signal, after the elapse of a first predetermined time interval to account for the delay time for the change of feed crude oil, to affect the quality of the product from the depropanizer tower. A feedback desired temperature signal is developed from the equations. The set point signal circuit provides the feedback desired temperature signal as the control signal whenever it is not providing the feed forward desired temperature signal as the control signal.

8 Claims, 3 Drawing Figures

CONTROLLING THE TEMPERATURE OF A DEPROPANIZER TOWER BY CHROMATOGRAPHIC ANALYSIS OF FEED AND BOTTOMS

BACKGROUND OF THE INVENTION

1. Field of the Invention

The present invention relates to control systems in general and, more particularly, to a control system for a system having a flash tower and a stabilizer tower.

2. Summary of the Invention

A system controls a refining unit which includes a first tower receiving a feed liquid which provides an overhead vapor to a second tower and a first processed liquid to a third tower. The second tower provides a second processed liquid, a portion of which is heated to a desired temperature by a heater and recirculated back to the second tower. The control system includes sensors sensing the propane contents of the vapor feeding the second tower and of the second processed liquid. A temperature sensor provides a signal corresponding to a sensed temperature of the second processed liquid. A circuit provides a feed forward signal corresponding to a desired temperature for the second processed liquid in accordance with the feed propane content signal. A network connected to the second processed liquid propane sensor provides a feedback signal corresponding to the desired temperature for the second processed liquid. A switching network provides the feed forward signal as a control signal for a predetermined time interval at some predetermined time after a substantial change in the feed propane content has occurred and in accordance with the sensed feed propane signal. The switching network also provides the feedback signal as the control signal when it is not providing the feed forward signal as the control signal. Apparatus controls the heater in accordance with the sensed temperature signal and the control signal so as to control the temperature of the second processed liquid being fed back to the second tower.

The objects and advantages of the invention will appear more fully hereinafter from a consideration of a detailed description which follows, taken together with the accompanying drawings wherein one embodiment of the invention is illustrated by way of example. It is to be expressly understood, however, that the drawings are for illustrative purposes only and are not to be construed as defining the limits of the invention.

DESCRIPTION OF THE INVENTION

Figure 1:
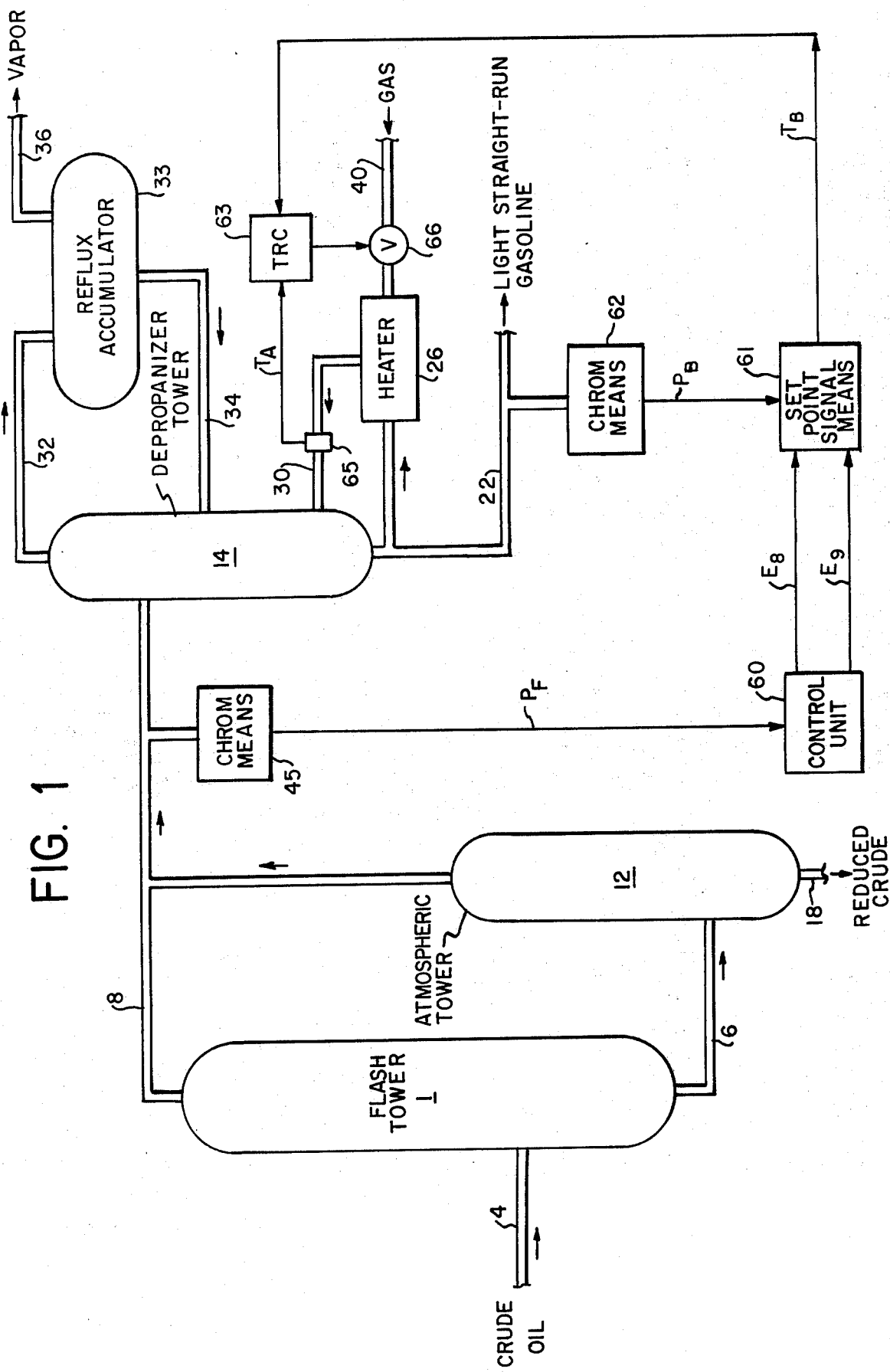
FIG. 1 is a simplified block diagram of a control system, constructed in accordance with the present invention, for controlling the temperature of light straight run gasoline from a deporpanizer tower in a refining system which is also partially shown in schematic form.

Referring to FIG. 1, there is shown a flash tower 1 receiving crude oil by way of a line 4 and providing flashed crude oil by way of a line 6 and light components vapor by way of a line 8. The flashed crude is provided to an atmospheric tower 12 while the light components vapor is provided to a stabilizer such as a depropanizer tower 14. Other stabilizers may be debutanizer, deisohexanizer and depentanizer towers.

Atmospheric tower 12 provides reduced crude by way of a line 18, while depropanizer tower 14 provides light straight run gasoline, hereinafter referred to as gasoline, some of which is heated by a heater 26 and fed back to the depropanizer tower 14 by way of a line 30.

Depropanizer tower 14 also provides an overhead product to a line 32 to a reflux accumulator which provides a liquid stream back to depropanizer tower 14 by way of a line 34 and a vapor product by way of a line 36.

The reboiler outlet temperature in tower 14 is controlled to help stabilize the gasoline in accordance with the following equations:

1. $\Delta T = (K_1)(\Delta RVP_B)$

2. $T_{FB} = K_1 (RVP_B)$

3. $\Delta RVP_B = \dfrac{(K_2)(\Delta RVP_c)}{RVP_c - K_2}$

4. $RVP_c = (K_2) + (K_3)(K_4)^{P_F}$

5. $RVP_B = (K_5)(P_B) + (K_6)$

6. $T_{FF} = T_s + \Delta T$ where $T_{FF}$ is the feedforward reboiler temperature, $T_{FB}$ is the feedback reboiler temperature, $T_S$ is a stored temperature value, $\Delta T$ is a change in reboiler temperature, $RVP_B$ is the Reid Vapor Pressure of the gasoline, $\Delta RVP_B$ is the change in Reid Vapor Pressure of the gasoline, $RVP_c$ is the Reid Vapor Pressure of the feed crude oil, $P_F$ is the propane content of the feed to depropanizer tower 14, $P_B$ is the propane content of the gasoline, $K_1$ through $K_7$ are constants which may have preferred values of 4.46, 5.5, 0.003, 3.344, 154, 8.64 and 0.83.

It should be noted that Equation 1 is only valid for small values of $\Delta RVP_B$ since it is an approximation of the following differential equation:

7. $D \ln RVP_B = \dfrac{L}{RT^2} dt$ where L is molal heat of vaporization, R is the gas constant and T is an absolute temperature.

The temperature of the light straight run gasoline leaving the depropanizer tower 14 is controlled by controlling gas being fed to heater 26 by way of a line 40 to achieve control of the stabilization of the gasoline product.

Chromatograph means 45 samples the feed to tower 14 and provides a signal $P_F$ corresponding to propane content of the feed to tower 14. Signal $P_F$ is provided to a control unit 60. Control unit 60, which will be explained in detail hereinafter, provides a temperature change signal $E_8$ and a pulse signal $E_9$ to set point means 61. Chromatograph means 62 samples the gasoline in line 22 and provides a signal $P_B$ corresponding to the propane content of the gasoline, to set point signal means 61. Set point signal means 61 provides a desired temperature signal $T_B$ to a temperature recorder-controller 63, to adjust the set point of temperature recorder-controller 63. Temperature recorder-controller 63 receives a signal $T_A$ corresponding to the temperature of the gasoline being returned to depropanizer tower 14 through line 30. Temperature recorder-controller 63 provides a signal to a valve 66 in line 40 to control the gas flow to heater 26 so as to control the temperature of the gasoline in accordance with the difference between the sensed temperature $T_A$ and a temperature associated with the position of the set point of controller 63, so that the temperature of the gasoline substantially corresponds to the desired temperature.

Figure 2:
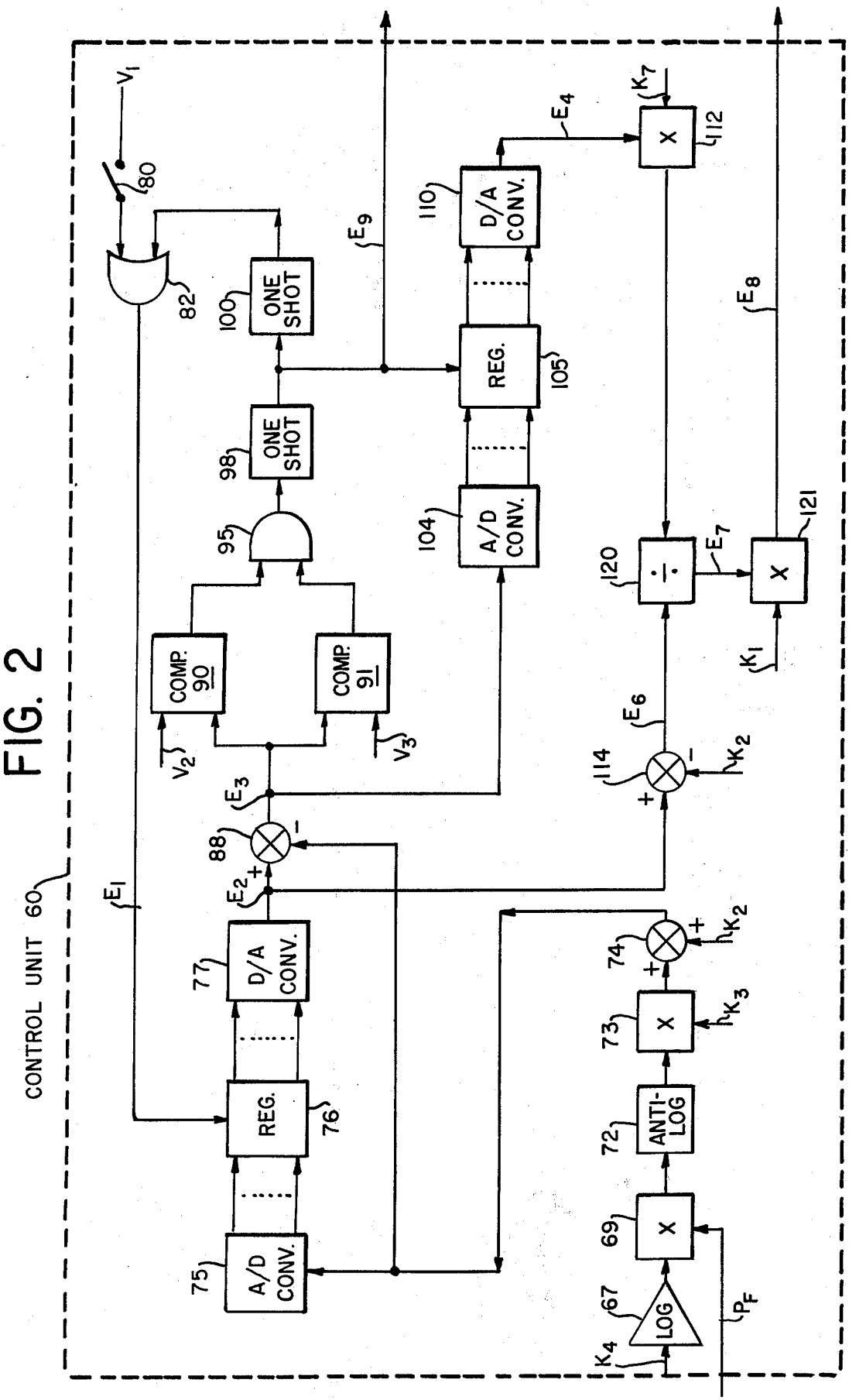
FIGS. 2 and 3 are detailed block diagrams of the control unit and the set point signal means, respectively, shown in FIG. 1.

Referring now to FIG. 2, control unit 60 includes a logarithmic amplifier 67 receiving a direct current voltage $K_4$ and providing a signal to a multiplier 69. Multiplier 69 multiplies signal $P_F$ with the signal from amplifier 67 to provide a signal to an antilog circuit 72. Antilog circuit 72 provides a signal corresponding to the term $(K_4)^{P_F}$ in equation 3. A multiplier 73 multiplies the signal from antilog circuit 72 with a direct current voltage $K_3$ to provide a signal $(K_3)(K_4)^{P_F}$ to summing means 74 where it is summed with a direct current voltage $K_2$.

Summing means 74 provides signal $RVP_c$ to an analog-to-digital converter 75 which converts signal $RVP_c$ to digital signals and provides them to a storage register 76. The entrance of the digital signals into register 76 is controlled by a pulse $E_1$ which is developed as hereinafter explained. Register 76 provides digital signals corresponding to its contents which are converted to an analog signal $E_2$ by a conventional type digital-to-analog converter 77. During operation, an initial signal $RVP_c$ is stored in register 76 by an operator who activates a momentary-type switch 80 receiving a direct current voltage $V_1$. The momentary activation of switch 80 causes voltage $V_1$ to be provided as a pulse to an OR gate 82 which in turn provides the pulse as pulse $E_1$, causing register 76 to enter the initial value for $RVP_c$. Signal $E_2$ corresponds to the stored RVP signal.

As the crude oil changes in quality, its $RVP_c$ changes accordingly. Subtracting means 88 subtracts the $RVP_c$ signal from signal $E_2$ to provide a difference signal $E_3$ corresponding to the change $\Delta RVP_c$ in the Reid Vapor Pressure of the crude oil. Since the Reid Vapor Pressure of the crude oil may change by slight amounts during normal operation it is necessary that only a substantial change in Reid Vapor Pressure activate the feedforward control system. In this regard comparators 90, 91 receive signal $E_3$ and voltages $V_2$ and $V_3$, respectively, corresponding to an upper limit and a lower limit, respectively, for a change $\Delta RVP_c$ in the Reid Vapor Pressure of the crude oil.

While signal $E_3$ is within the limits defined by voltages $V_2$ and $V_3$, comparators 90 and 91 provide high level outputs to an AND gate 95 which in turn provides a high level output to a one-shot multivibrator 98. Should signal $E_3$ exceed either limit, one of the comparators 90 or 91 will provide a low level output causing AND gate 95 to provide a low level output to one-shot 98. The changing from a high level to a low level triggers one-shot multivibrator 98 causing it to provide a pulse whose trailing edge triggers another one-shot multivibrator 100 causing it to provide a pulse to OR gate 82. OR gate 82 provides the pulse as pulse $E_1$. This pulse controls register 73 to enter the digital signals corresponding to the new value for the Reid Vapor Pressure for the crude oil.

Signal $E_3$ corresponding to the change in the Reid Vapor Pressure is also provided to another analog-to-digital converter 104 which converts signal $E_3$ to digital signals and provides them to a storage register 105. The entry of digital signals from converter 104 into register 105 is controlled by the leading edge of the pulse from one-shot 98 so that prior to signal $E_3$ being changed as a result of a pulse $E_1$, the digital value for signal $E_3$ is stored in register 105. Register 105 provides digital signals, corresponding to the stored $\Delta RVP_c$ value, to a digital-to-analog converter 110 which in turn provides an analog signal $E_4$ corresponding to the stored change in the Reid Vapor Pressure $\Delta RVP_c$ of equation 3. A multiplier 112 multiplies signal $E_4$ with a direct current voltage $K_7$.

Subtracting means 114 subtracts a direct current voltage $K_2$ from signal $E_2$ to provide a signal $E_6$ corresponding to the expression $RVP_c-K_2$. A divider 120 divides signal $E_5$ with signal $E_6$ to provide a signal $E_7$ corresponding to the change in the Reid Vapor Pressure that will occur in the depropanizer tower 14 product quality as a result of the change in the crude charge quality. Signal $E_7$ is multiplied with a direct current voltage $K_1$ by a multiplier 121 to provide a signal $E_8$ corresponding to the change in reboiler temperature required to return the product gasoline Reid Vapor Pressure to the desired value.

Figure 3:
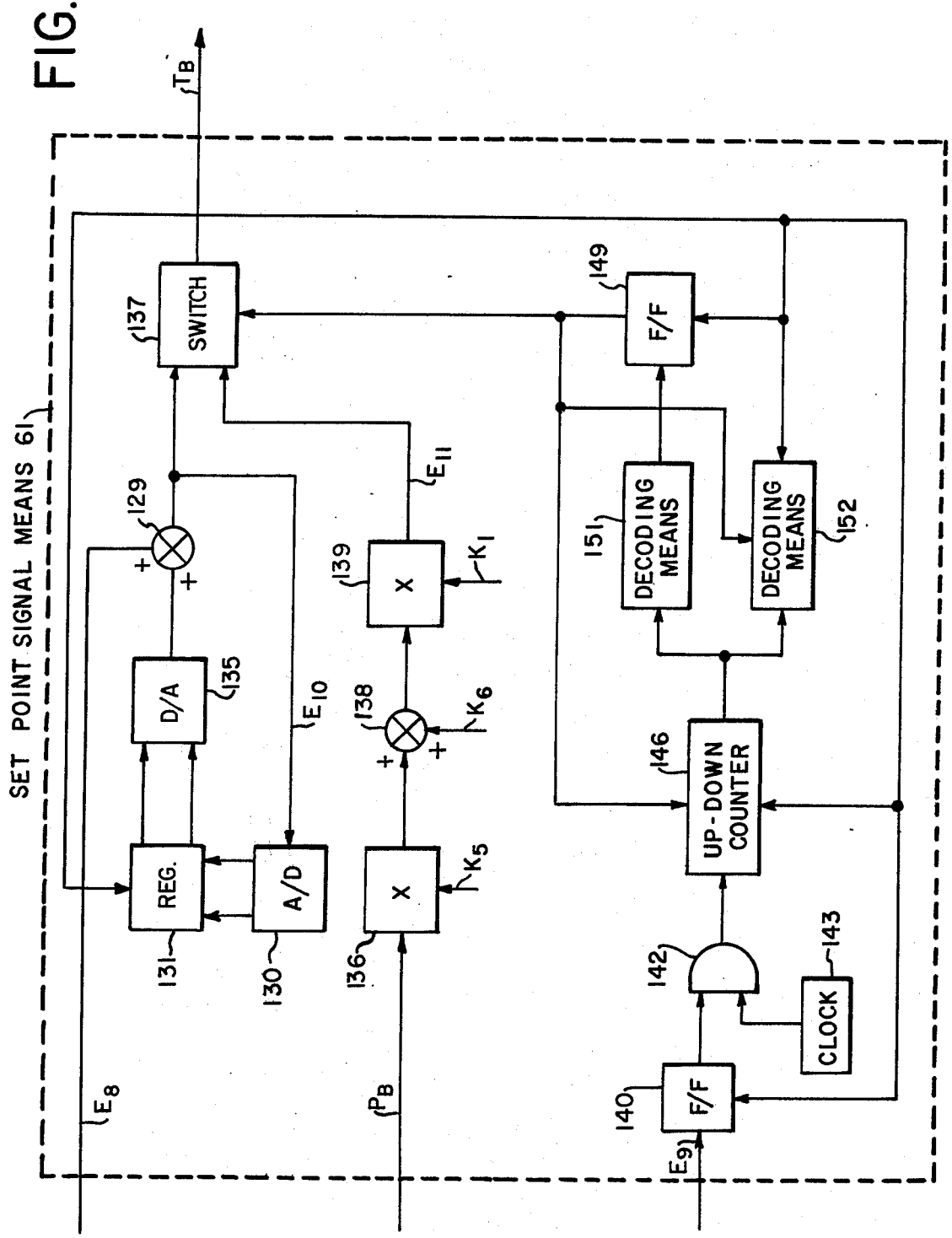

Referring to FIGS. 1, 2 and 3, signal $E_8$ is summed with a signal corresponding to the reboiler temperature associated with stored $RVP_B$ to provide a signal $E_{10}$ corresponding to the reboiler temperature associated with the new $RVP_c$.

Signal $E_{10}$ is applied to a conventional type analog-to-digital converter 130 which converts signal $E_{10}$ to corresponding digital signals and provides the digital signals to a register 131.

At this point $E_{10}$ has not changed value to any significant extent. Register 131 provides digital signals to a digital-to-analog converter 135 which in turn provides a signal to summing means 129. Signal $E_{10}$ will not change value until the change in crude oil quality causes a pulse $E_9$ to occur as heretofore explained. Pulse $E_9$ occurs prior to pulse $E_1$ so that when pulse $E_9$ occurs the digital versions of signals $E_2$ and $E_{10}$ are entered into registers 105 and 131, respectively, before signals $E_2$ and $E_{10}$ change values. Signal $E_{10}$ is also applied to switch 137. Switch 137 is an electronic switch which in essence is a single pole, double throw switch and selects between signal $E_{10}$ and signal $E_{11}$ to pass one of them as signal $T_B$.

A multiplier 136 multiplies signal $P_B$ with a direct current voltage $K_5$ to provide a signal $K_5 P_B$ to summing means 138. Summing means 138 sums signal $K_5$ with a direct current voltage $K_6$ to provide a signal $RVP_B$ to a multiplier 139. Multiplier 139 multiplies signal $RVP_B$ with voltage $K_1$ to provide a temperature signal $E_{11}$, that is based on feedback information, to switch 137.

Switch 137 is controlled in a manner, as hereinafter explained, so that during operation it will pass signal $E_{11}$ as signal $T_B$ when a change in the quality of crude oil occurs, that is $\Delta RVP_c$ exceeds one of its limits. Signal $E_{10}$ will go to the new value for the reboiler temperature associated with the new quality of crude oil. However, switch 137 will not pass signal $E_{10}$ immediately but there will be a predetermined time delay and after that predetermined time delay switch 137 will be controlled to pass signal $E_{10}$ as signal $T_B$. The delay is desirable since signal $E_{10}$ is a feed forward signal. New feed resulting from the new crude oil will not reach the depropanizer tower 14 until after the lapse of a time interval. Switch 137 will pass signal $E_{10}$ for another predetermined time period and then block signal $E_{10}$ and pass signal $E_{11}$. The second predetermined time interval is necessary so that the feed forward signal $E_{10}$ has control of the system until the product reaches specifications. When the second predetermined time interval has elapsed, control is then returned to the feedback signal to keep the system on specification so as to control it for variations in the quality of crude oil that is not substantial enough to change the feedforward signal.

All of the foregoing is accomplished in the following manner: Pulse $E_9$ from one-shot 98 in control unit 60 triggers a flip-flop 140 to a set state. A direct current output provided by flip-flop 140 goes to a high level when flip-flop 140 is in a set state. The high level output from flip-flop 140, since it is now in a set state, enables an AND gate 142 to pass pulses from a clock 143 to an up-down counter 146. Up-down counter 146 starts to count up the pulses passed by AND gate 142. Another flip-flop 149 is in a clear state and its low level output causes counter 146 to count in an up direction. The count in up-down counter 146 is decoded by decoding means 151 and 152. Decoding means 152 provides an output for a count that is less than a count that causes decoding means 151 to provide an output. However, decoding means 152 is also controlled by the output from flip-flop 149 so that it will provide no output while counter 146 is counting up. As a result, counter 146 continues to count up past the value for decoding means 152 until it reaches a predetermined value for decoding means 151 causing it to provide a pulse to flip-flop 149 triggering it to a set state. Flip-flop 149 provides a high level direct current output to switch 137 causing switch 137 to provide signal $E_{10}$ as signal $T_B$. It can be appreciated that the time delay in the counting up to the value that caused decoding means 151 to provide the pulse, corresponds to the predetermined time delay.

The high level output from flip-flop 149 is also applied to up-down counter 146 and to decoding means 152. Since its direction signal is at a high level up-down counter 146 now starts to count down the pulses passed by AND gate 142. Since decoding means 152 is enabled by the high level output from flip-flop 149 when counter 146 reaches another predetermined count, decoding means 152 provides a pulse which resets flip-flop 149 to a clear state, resets up-down counter 146 to a zero count and resets flip-flop 140 to a clear state to stop the counting process by disabling AND gate 142 and causes register 131 to enter the digital signals corresponding to $E_{10}$. It can be appreciated that the time interval caused by the counting down by up-down counter 146 from its high value to the value which triggers the decoding means 152 corresponds to the time interval that feedforward signal $E_{10}$ controls the process. The low level output from flip-flop 149 causes switch 137 to again pass signal $E_{11}$ as signal $T_B$.

The system of the present invention as heretofore described controls the reboiler temperature of a depropanizer tower in accordance with the propane content of the feed to the tower and the propane content of gasoline provided by the depropanizer tower. The control system controls the temperature so that a feedforward control signal is developed in accordance with the propane content of the feed to the depropanizer tower and after the process change is completed, a feedback signal, as developed from the propane content of the gasoline, is utilized to maintain the gasoline at the desired temperature.

What is claimed is:
1. A control system for a refining unit including a flash tower receiving raw crude oil and providing a light component vapor to a depropanizer tower and flash crude oil to an atmospheric tower with the depropanizer tower providing light straight run gasoline, a portion of which is heated to a desired temperature by a heater and recirculated back to the depropanizer tower, comprising first chromatograph means for sensing the propane content of the light component vapor and providing a signal $P_F$ corresponding thereto, second chromatograph means for sensing the propane content of the gasoline and providing a corresponding signal $P_B$, means for sensing the temperature of the gasoline being fed back to the second tower and providing a signal $T_A$ corresponding thereto, means connected to the first chromatograph means providing a feed forward signal corresponding to a desired temperature for the gasoline in accordance with the sensed light component vapor propane content signal, means connected to the second chromatograph means for providing a feedback signal corresponding to the desired temperature for the gasoline, means connected to the feed forward signal means and to the feedback signal means for providing the feed forward signal as the control signal for a predetermined time interval at some predetermined time after a substantial change in the raw crude oil propane content has occured and in accordance with the sensed raw crude oil propane content signal $P_F$ and for providing the feedback signal as the control signal when not providing the feed forward signal as the control signal, and means receiving the control signal and the sensed temperature signal $T_A$ for controlling the heater in accordance with said signal so as to control the temperature of the second processed liquid being fed back to the second tower.

2. A system as described in claim 1 in which the feed forward signal means includes first means connected to the first chromatograph means providing the signal corresponding to the propane content of the light component vapor for providing a signal corresponding to the Reid Vapor Pressure $RVP_c$ of the crude oil, means connected to the Reid Vapor Pressure signal means for storing the Reid Vapor Pressure signal in response to a control pulse, means connected to the first storing means and to the Reid Vapor Pressure signal means for providing a signal corresponding to a difference between the current Reid Vapor Pressure signal and the stored Reid Vapor Pressure signal, comparing means connected to the difference signal means receiving direct current voltages corresponding to predetermined limits for a change in the Reid Vapor Pressure for comparing the difference signal with the reference voltages and providing a signal corresponding to the comparison, pulse means connected to the comparing means for providing sequentially a first and a second control pulse in response to the comparison signal indicating that the difference signal has exceeded a predetermined limit, the first control pulse being provided to the first storing means, second means connected to the pulse means and to the difference signal means for storing the difference signal in response to the second control pulse provided by the pulse means, means connected to the two storing means for providing a signal corresponding to a current change $\Delta T$ in temperature for the light straight run gasoline in accordance with the signals from the storing means and the following equations:

$$\Delta RVP_B = \frac{K_1(\Delta RVP_c)}{RVP_c - K_2} \text{ and}$$

$$\Delta T = (K_1)(\Delta RVP_B)$$

where $\Delta RVP_c$ and $\Delta RVP_B$ are the changes in the Reid Vapor Pressures for the crude oil and the gasoline, respectively, and $K_1$, $K_2$ and $K_3$ are constants, and means connected to the $\Delta T$ signal means for providing the feed forward signal in accordance with the $\Delta T$ signal.

3. A system as described in claim 2 in which the feedback signal means includes means connected to the gasoline propane content chromatograph means for providing a signal corresponding to the Reid Vapor Pressure $RVP_B$ of the light straight run gasoline in accordance with the light straight run gasoline propane content signal and the following equation:

$$RVP_B = (K_5)(P_B) + K_6$$

where $P_B$ is the propane content of the light straight run gasoline and $K_5$ and $K_6$ are constants, network means connected to $RVP_B$ signal means for providing the feedback signal in accordance with the $RVP_B$ signal, timing means connected to the pulse means for providing a second control signal of one amplitude at a predetermined time after the occurrence of a second control pulse and for a predetermined time interval and of another amplitude during any time other than the predetermined time interval, and switching means receiving the feed forward signal and the feedback signal and controlled by the second control signal from the timing means to pass the feedback signal as the first mentioned control signal, when the second control is of the other amplitude signal while blocking the feed forward signal and for providing the feed forward signal as the first mentioned control signal when the second control signal is of the one amplitude from the timing means while blocking the feedback signal.

4. A system as described in claim 3 in which the Reid Vapor Pressure signal means provides the signal corresponding to the Reid Vapor Pressure $RVP_c$ of the crude oil in accordance with the following equation:

$$RVP_c = (K_2) + (K_3)(K_4)^{P_F}$$

where $P_F$ is the propane content of the light component vapor and $K_2$, $K_3$ and $K_4$ are constants.

5. A system as described in claim 4 in which the timing means includes a first flip-flop receiving the second control pulse, means for providing timing pulses, an AND gate connected to the first flip-flop and to the timing pulse means for passing the timing pulses from the timing pulse means when the flip-flop is in a set state and for blocking the timing pulse when the first flip-flop is in a clear state, up-down counting means connected to the AND gate and receiving the second control signal for counting up passed timing pulses from the AND gate when the second control signal is of the other amplitude and for counting down the passed timing pulses when the second control signal is of the one amplitude, means connected to the up-down counting means for decoding the count in the counting means a manner so as to provide a third control pulse when the up-down counter is counting up and reaches a predetermined count and a fourth control pulse when the up-down counter is counting down from the first predetermined count and reaches a second predetermined count, a second flip-flop connected to the decoding means and to the switching means and to the up-down counting means for providing the second control signal to the switching means and to the up-down counter; and in which the third control pulse resets both flip-flops and the up-down counting means.

6. A system as described in claim 5 in which the feedback signal network means provides the feedback signal $T_B$ in accordance with the following equation:

$$T_{FB} = K_1 (RVP_B)$$

where $K_1$ is a constant.

7. A system as described in claim 6 in which the feed forward signal network means includes means connected to the $\Delta T$ signal means and receiving a signal corresponding to a stored gasoline temperature signal $T_S$ associated with the next previous Reid Vapor Pressure of the crude oil prior to a substantial change in the crude oil Reid Vapor Pressure for providing the feed forward signal $T_{FF}$ in accordance with the following equation:

$$T_{FF} = T_S + \Delta T, \text{ and}$$

means connected to the last mentioned means and to the decoding means for storing the signal $T_{FF}$ in response to the fourth control pulse and for providing the stored signal $T_{FF}$ as the stored temperature signal $T_S$.

8. A system as described in claim 7 in which the constants $K_1$ through $K_7$ have preferred values of 4.46, 5.5, 0.003, 3.344, 154, 8.64 and 0.83.

\* \* \* \* \*